US012481886B2

(12) United States Patent
Zhang et al.

(10) Patent No.: US 12,481,886 B2
(45) Date of Patent: *Nov. 25, 2025

(54) CALCULATING DEVICE AND METHOD FOR A SPARSELY CONNECTED ARTIFICIAL NEURAL NETWORK

(71) Applicant: Cambricon Technologies Corporation Limited, Beijing (CN)

(72) Inventors: Shijin Zhang, Beijing (CN); Qi Guo, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 1626 days.

This patent is subject to a terminal disclaimer.

(21) Appl. No.: 15/975,075

(22) Filed: May 9, 2018

(65) Prior Publication Data

US 2018/0260710 A1    Sep. 13, 2018

Related U.S. Application Data

(62) Division of application No. PCT/CN2016/078545, filed on Jan. 20, 2016.

(30) Foreign Application Priority Data

Jan. 20, 2016  (CN) .......................... 201610039162.5

(51) Int. Cl.
*G06N 3/082*  (2023.01)
*G06F 17/15*  (2006.01)
*G06F 17/16*  (2006.01)

(52) U.S. Cl.
CPC ............. *G06N 3/082* (2013.01); *G06F 17/15* (2013.01); *G06F 17/16* (2013.01)

(58) Field of Classification Search
CPC .... G06N 3/082; G06N 3/0454; G06N 3/0481; G06N 3/063; G06F 17/15; G06F 17/16; G06F 7/5443; G06F 2207/4824; G06K 9/6256; G06K 9/30145; B63B 13/00
USPC .......................................................... 706/25
See application file for complete search history.

(56) References Cited

U.S. PATENT DOCUMENTS

| 5,347,613 A | 9/1994 | Chung et al. |
| 5,517,596 A | 5/1996 | Pachanek et al. |
| 9,015,093 B1 * | 4/2015 | Commons .......... G01C 21/3602 706/26 |

(Continued)

OTHER PUBLICATIONS

"Elements of artificial neural networks" Mehrotra, 1997, MIT Press.*

(Continued)

*Primary Examiner* — Vincent Gonzales
(74) *Attorney, Agent, or Firm* — Getech Law LLC; Jun Ye

(57) ABSTRACT

Aspects for modifying data in a multi-layer neural network (MNN) acceleration processor for neural networks are described herein. As an example, the aspects may include receiving a predetermined weight value array and connection data. Further, the aspects may include modifying the weight values included in the predetermined weight value array based on the connection data. Further still, the aspects may include calculating one or more groups of output data based on the modified weight values.

14 Claims, 16 Drawing Sheets

(56) References Cited

U.S. PATENT DOCUMENTS

| | | | | |
|---|---|---|---|---|
| 2002/0143720 | A1* | 10/2002 | Anderson | G06N 3/105 706/26 |
| 2009/0192958 | A1* | 7/2009 | Todorokihara | G06N 3/10 706/27 |
| 2015/0026100 | A1* | 1/2015 | Kudritskiy | G06N 3/04 706/11 |
| 2015/0100530 | A1 | 4/2015 | Mnih et al. | |
| 2015/0269479 | A1* | 9/2015 | Julian | G06N 3/0481 706/25 |
| 2017/0177404 | A1* | 6/2017 | Drysdale | G06F 9/5061 |
| 2017/0277658 | A1* | 9/2017 | Pratas | G06F 12/0862 |
| 2018/0046900 | A1* | 2/2018 | Dally | G06F 9/30018 |
| 2018/0121796 | A1* | 5/2018 | Deisher | G06N 3/0472 |
| 2019/0050734 | A1* | 2/2019 | Li | G06N 3/0454 |
| 2019/0138922 | A1* | 5/2019 | Liu | G06N 3/048 |
| 2019/0272631 | A1* | 9/2019 | Shemonski | A61B 3/102 |

OTHER PUBLICATIONS

"neural networks" Haykin. 1999, Pearson Education.*
Liu, Baoyuan, Min Wang, Hassan Foroosh, Marshall Tappen, and Marianna Pensky. "Sparse convolutional neural networks." In Proceedings of the IEEE conference on computer vision and pattern recognition, pp. 806-814. 2015. (Year: 2015).*
Reed, Russell. "Pruning algorithms—a survey." IEEE transactions on Neural Networks 4, No. 5 (1993): 740-747. (Year: 1993).*
Cheng, Hongrong, Miao Zhang, and Javen Qinfeng Shi. "A survey on deep neural network pruning: Taxonomy, comparison, analysis, and recommendations." IEEE Transactions on Pattern Analysis and Machine Intelligence (2024). (Year: 2024).*
CN 201710794713.3, Official Action, Mailed Apr. 3, 2020, 9 Pages.
CN 201710794711.4, Official Action, Mailed Apr. 3, 2020, 9 Pages.
EP 16885910.6—Response to Rules 70(2) and 70a(2) EPC, filed Oct. 21, 2019, 49 pages.
EP 16885910.6—Communication Pursuant to Article 94(3) EPC, mailed Jan. 14, 2021, 6 pages.
EP 16885910.6—Response to Communication Pursuant to Article 94(3) EPC, filed Oct. 13, 2020, 22 pages.
CN 201610039162.5—First Office Action, mailed Jan. 16, 2017. 5 pages. (no English translation).
CN 201710794715.2—First Office Action, mailed Feb. 3, 2020, 5 pages. (no English translation).
CN 201710794715.2—Second Office Action, mailed Aug. 24, 2020, 6 pages. (no English translation).
CN 201710794713.3—First Office Action, mailed Apr. 3, 2020, 10 pages. (no English translation).
CN 201710794713.3—Second Office Action, mailed Nov. 6, 2020, 8 pages. (no English translation).
CN 201710794711.4—First Office Action, mailed Apr. 3, 2020, 10 pages. (no English translation).
CN 201710794711.4—Second Office Action, mailed Dec. 15, 2020, 8 pages. (no English translation).
PCT/CN2016/078545—International Search Report, mailed Oct. 21, 2016, 14 pages. (no English translation).
KR 10-2018-7015437—Office Action, mailed Jan. 16, 2020, 158 pages. (no English translation).
KR 10-2018-7018864—Office Action, mailed Jan. 16, 2020, 158 pages. (no English translation).
KR 10-2018-7018866—Office Action, mailed Jan. 16, 2020, 158 pages. (no English translation).
PCT/CN2016078545—16885910.6—Supplementary European Search Report, mailed Sep. 6, 2019, 1 page.
PCT/CN2016078545—16885910.6—Extended European Search Report, mailed Aug. 20, 2019, 9 page.
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
EP 16 885 910.6—Summons to attend oral proceedings to Rule 115(1) EPC, mailed Jan. 12, 2022, 11 pages.

* cited by examiner

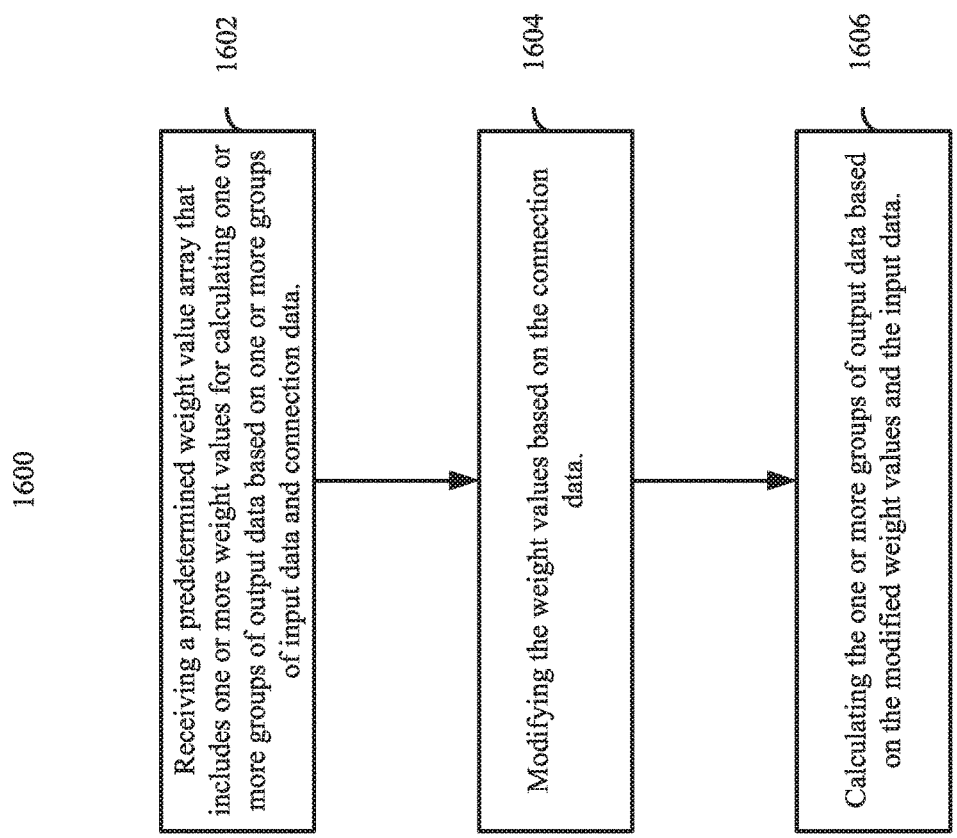

CALCULATING DEVICE AND METHOD FOR A SPARSELY CONNECTED ARTIFICIAL NEURAL NETWORK

BACKGROUND

Artificial Neural Networks (ANNs), or Neural Networks (NNs) for short, are algorithmic mathematical models imitating the behavior characteristics of animal neural networks and performing the distributed concurrent information processing. Depending on complexity of a system, such networks adjust interconnection among a great number of internal nodes, thereby achieving the purpose of information processing. The algorithm used by NNs may be vector multiplication (also referred as "multiplication") and convolution, which widely adopts sign functions and various approximations thereof.

As neural networks in animal brains, NNs consist of multiple interconnected nodes. As shown in FIG. 3, each block represents a node and each arrow represents a connection between two nodes.

The calculation formula of a neuron can be briefly described as $y=f(\Sigma_{i=0}^{n} w_i * x_i)$, wherein x represents input data received at all input nodes connected to the output nodes, w represents corresponding weight values between the input nodes and the output nodes, and f(x) is a nonlinear function, usually known as an activation function including those commonly used functions such as $$\frac{1}{1+e^{-x}} \text{ and } \frac{e^x - e^{-x}}{e^x + e^{-x}}.$$

NNs are widely applied to a variety of applications, such as computer vision, voice recognition and natural language processing. In recent years, the scale of NNs has been growing. For example, in 1998, Lecun's neural network for handwriting characters recognition includes less than 1 M weight values; while in 2012, Krizhevsky for participating ImageNet competition includes 60 M weight values.

NNs are applications that require large amounts of calculation and great bandwidth for memory access. The more weight values, the more amounts of calculation and memory access are required. In order to decrease the account of calculation and the number of weight values thereby reducing memory access, a sparsely connected neural network may be implemented.

Even as the amount of calculation and the amount of memory access of NNs dramatically increase, a general-purpose processor is conventionally adopted to calculate a sparse artificial neural network. With regard to the general-purpose processor, the input neurons, output neurons and weight values are respectively stored in three arrays, meanwhile there is an index array for storing the connection relation between each output neuron and input neuron connected by weight values. At the time of calculating, a major operation is a multiplication of input data and a weight value. Each calculation needs to search a weight value corresponding to the input data through the index array. Since the general-purpose processor is weak in both calculation and memory access, demands of NNs may not be satisfied. Nevertheless, when multiple general-purpose processors work concurrently, inter-processor communication becomes a performance bottleneck again. In some other aspects, when calculating a neural network after pruning, each multiplication operation needs to re-search positions corresponding to the weight values in the index array, which increases additional calculation amounts and memory access overhead. Thus, NNs calculation is time-consuming and power-consuming. General-purpose processors need to decode an operation of a multiple-layer artificial neural network into a long sequence of operations and memory access instructions, and front-end decoding brings about a larger overhead.

Another known method to support the operations and training algorithms of a sparsely connected artificial neural network is to use a graphics processing unit (GPU). In such method a general-purpose register file and a general-purpose stream processing unit are used to execute a universal Single-instruction-multiple-data (SIMD) instruction to support the aforementioned algorithm. Since a GPU is a device specially designed for executing graph and image operations as well as scientific calculation, it fails to provide specific support for sparse artificial neural network operations. As such, GPUs also need a great amount of front-end decoding to execute sparse artificial neural network operations, thus leading to additional overheads. In addition, since GPU only contains relative small on-chip caching, then model data (e.g., weight values) of a multiple-layer artificial neural network has to be repeatedly retrieved from outside the chip. Thus, off-chip bandwidth becomes a main performance bottleneck while producing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for modifying data in an MNN acceleration processor for neural networks. An example apparatus may include a data modifier configured to receive a predetermined weight value array that includes one or more weight values for calculating one or more groups of output data based on one or more groups of input data. The one or more groups of input data are stored as input elements in an input array and each of the input elements may be identified by an input array index. The one or more groups of output data may be stored as output elements in an output array and each of the output elements may be identified by an output array index. Further, the data modifier may be configured to receive connection data that include one or more connection values. Each of the connection values may correspond to one of the input array indexes and one of the output array indexes and may indicate whether one of the weight values in the predetermined weight value array is designated for calculating a group of the output data to be stored as the output element identified by the corresponding output array index based on a group of the input data stored as the input element identified by the corresponding input array index, and whether the weight value meets a predetermined condition. The data modifier may be further configured to modify the weight values based on the connection data. In addition, the example apparatus may include a computing unit configured to receive the modified weight values from the data modifier and the one or more groups of input data and calculate the one or more groups of output data based on the modified weight values and the received input data.

An example method for modifying data in an MNN acceleration processor for neural networks may include receiving a predetermined weight value array that includes one or more weight values for calculating one or more groups of output data based on one or more groups of input data. The one or more groups of input data may be stored as input elements in an input array and each of the input elements may be identified by an input array index. The one or more groups of output data may be stored as output elements in an output array and each of the output elements may be identified by an output array index. Further, the example method may include receiving connection data that include one or more connection values. Each of the connection values may correspond to one of the input array indexes and one of the output array indexes and may indicate whether one of the weight values in the predetermined weight value array is designated for calculating a group of the output data to be stored as the output element identified by the corresponding output array index based on a group of the input data stored as the input element identified by the corresponding input array index, and whether the weight value meets a predetermined condition. In addition, the example method may include modifying the weight values based on the connection data and calculating the one or more groups of output data based on the modified weight values and the input data.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 16 is a flow chart of aspects of another example method for modifying data for neural networks.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

A typical conceptual model of a multi-layer neural network (MNN) may include multiple layers of neurons. Each neuron is an information-processing unit that is fundamental to the operation of a neural network. In more detail, a typical model of a neuron may include three basic elements, e.g., a set of synapses, an adder, and an activation function. In a form of a mathematical formula, the output signals of a neuron may be represented as $y_k = \varphi(\Sigma_{j=1}^{m} w_{kj} x_j + b_k)$, in which $y_k$ represents the output signals of the neuron, $\varphi()$ represents the activation function, $w_{kj}$ represents one or more weight values, $x_j$ represents the input signals of the neuron, and $b_k$ represents a bias value. In other words, a simplified model of a neuron may include one or more input nodes for receiving the input signals or data and an output node for transmitting the output signals or data to an input node of another neuron at the next level. Thus, a layer of neurons may at least include a layer of multiple input nodes and another layer of output nodes.

Figure 1:
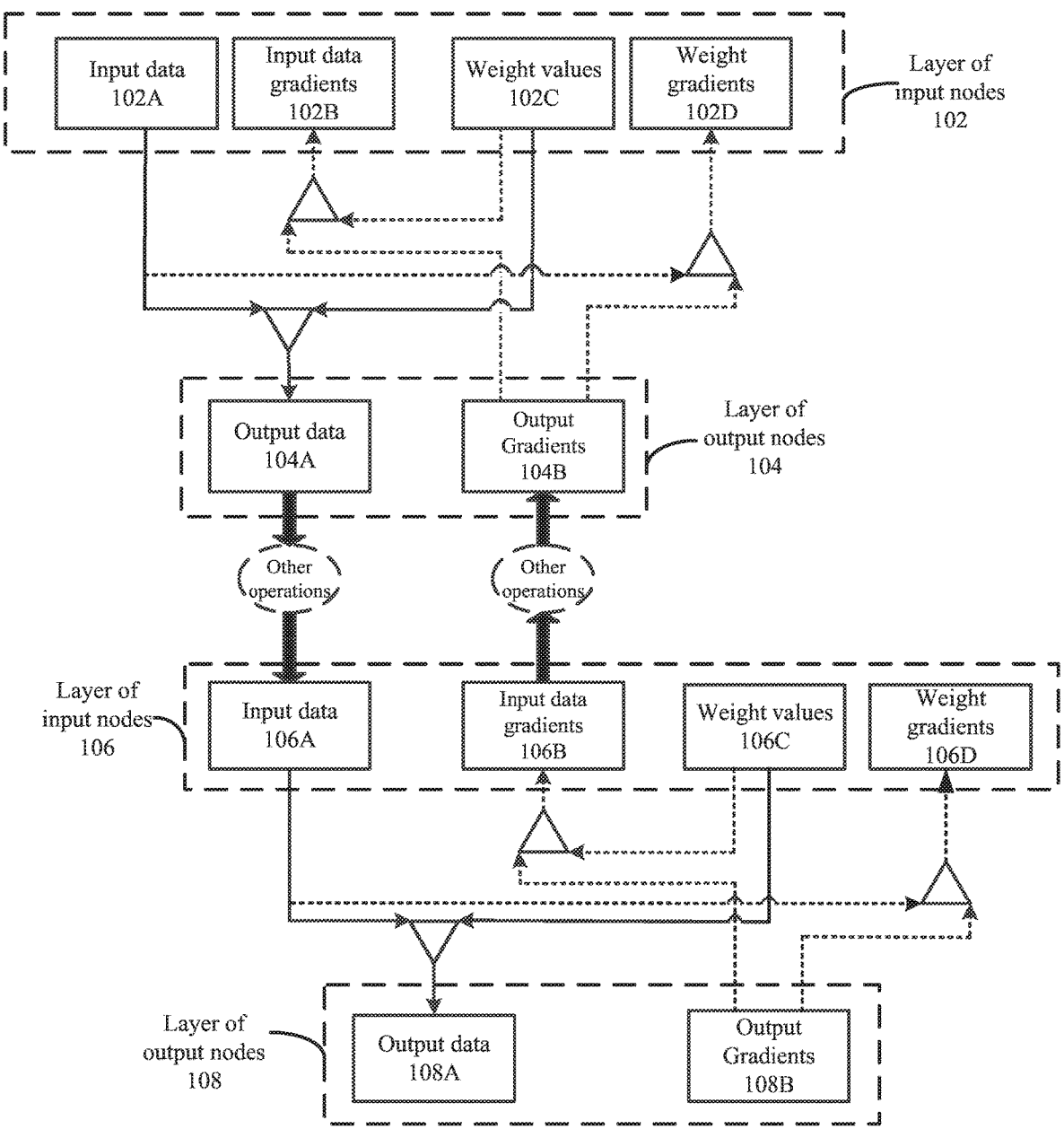
FIG. 1 is a block diagram illustrating an example computing process at an MNN acceleration processor for neural networks.

FIG. 1 is a block diagram illustrating an example computing process 100 at an MNN acceleration processor for neural networks. As depicted, the example computing process 100 may be performed by a layer of input nodes 102, a layer of output nodes 104, a layer of input nodes 106, and a layer of output nodes 108. A triangular-shaped operator (Δ as shown in FIG. 1) may indicate a matrix multiplication or a convolution operation. It is notable that the layers of input nodes and output nodes may not be the first layer and the last layer of the entire neural network in the process. Rather, the layers of input and output nodes may refer to the nodes included in any two consecutive layers of neurons of a neural network. As described below in greater detail, the computing process from the layers of input nodes 102 to the layer of output nodes 108 may be referred to as a forward propagation process; the computing process from the layer of output nodes 108 to the layer of input nodes 102 may be referred to as a backward propagation process.

The forward propagation process may start from one or more input nodes that receive input data 102A. The received input data 102A may be multiplied or convolved by one or more weight values 102C. The results of the multiplication or convolution may be transmitted to one or more output nodes at the layer of output nodes 104 as output data 104A. The output data 104A, with or without further operations, may be transmitted to one or more input nodes at the next layer (e.g., the layer of input nodes 106) as input data 106A. Similarly, the input data 106A may be multiplied or convolved by one or more weight values 106C. The results of the multiplication or convolution may be similarly transmitted to one or more output nodes at the layer of output nodes 108 as output data 108A.

The backward propagation process may start from one or more output nodes at the last layer of nodes of the forward propagation process (e.g., the layer of output nodes 108). For example, output gradients 108B generated at the layer of output nodes 108 may be multiplied or convolved by the input data 106A to generate weight gradients 106D at the layer of input nodes 106. The output gradients 108B may be further multiplied or convolved by the weight values 106C to generated input data gradients. The input data gradients 106B, with or without other operations between layers, may be transmitted to one or more nodes at the layer of output nodes 104 as output gradients 104B. The output gradients 104B may then be multiplied or convolved by the input data 102A to generate weight gradients 102D. Additionally, the output gradients 104B may be multiplied by the weight values 102C to generate input data gradients 102B.

Figure 2:
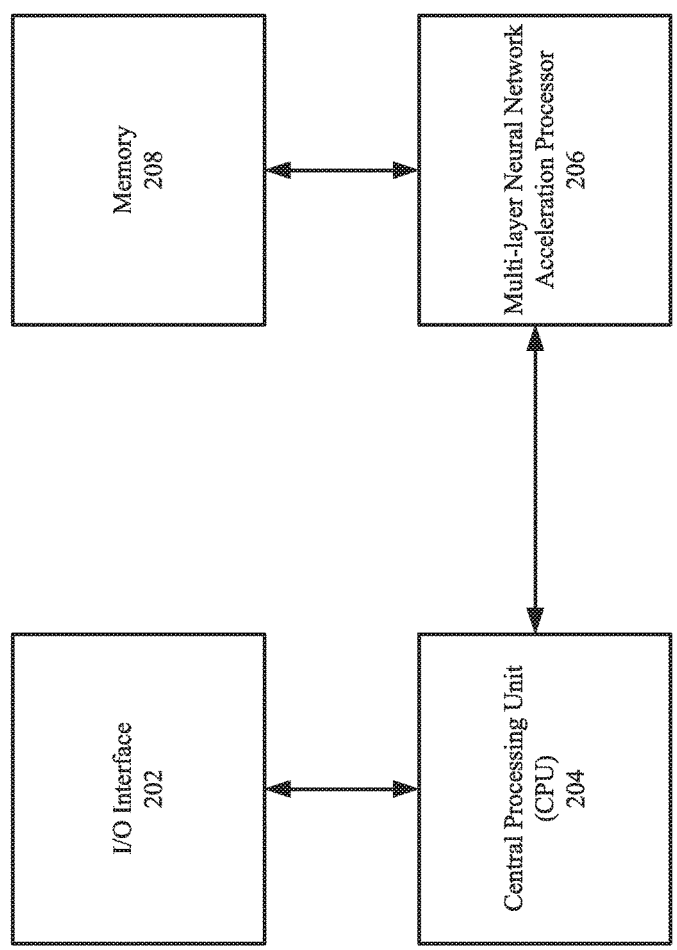
FIG. 2 is a block diagram illustrating an example computer system in which data modification for neural networks may be implemented.

FIG. 2 is a block diagram illustrating an example computer system 200 in which data modification for neural networks may be implemented. The example computer system 200 may include at least an I/O interface 202, a central processing unit (CPU) 204, a multi-layer neural network acceleration processor 206, and a memory 208. The I/O interface 202 may be configured to exchange data or information with peripheral devices, e.g., input devices, storage devices, etc. Data received from the I/O interface 202 may be further processed at the CPU 204. Data that require processing at an MMN may be transmitted to the MNN acceleration processor 206. For example, the forward propagation process and the backward propagation process described above in accordance with FIG. 1 may be performed at the MNN acceleration processor 206. Other data for the forward propagation process and the backward propagation process, e.g., weight values 102C and 106C, may be retrieved from the memory 208 and stored on the MNN acceleration processor 206 during the processes. However, as discussed above, the index array that indicates the correspondence between the input data and the weight values is conventionally stored on the memory 208. At each multiplication or convolution that involves the weight values, retrieving the index array from the memory 208 may cause significant system delays or bandwidth consumption. The MNN acceleration processor 206 may be described in further detail below.

Figure 3:
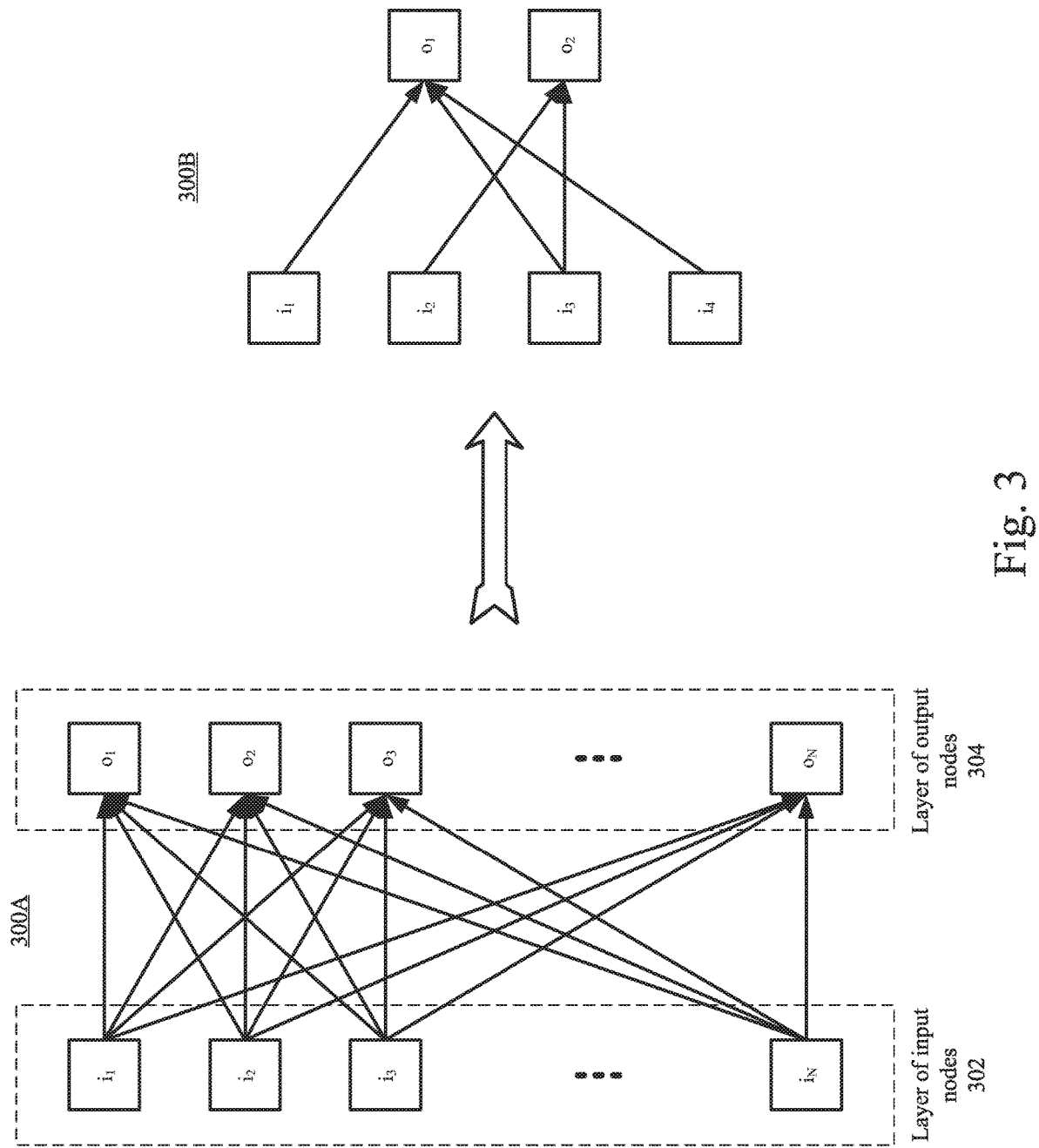
FIG. 3 is a diagram illustrating a comparison between a regular MNN and a sparse MNN in which data modification for neural networks may be implemented.

FIG. 3 is a diagram illustrating a comparison between a regular MNN 300A and a sparse MNN 300B in which data modification for neural networks may be implemented. As depicted, the regular MNN 300A may include a layer of input nodes 302 and a layer of output nodes 304. Each block shown in the regular MNN 300A indicates an input node or an output node. The arrows between the input nodes (e.g., $i_1$, $i_2$, $i_3$ ... $i_N$) and the output nodes (e.g., $o_1$, $o_2$, $o_3$ ... $o_N$) indicate those non-zero weight values for calculating the output data. For example, $w_{11}$ may be the weight value for calculating the output data at output node $o_1$ based on the input data received at input node $i_1$. However, in some applications of neural networks, more than one of the weight values may be zero, in which case input data received at more than one input nodes are not considered for calculating some output data. In these cases, the arrows between corresponding input nodes and output nodes will be deleted and the MNN may be referred to as a sparse MNN, e.g., sparse MNN 300B. As shown in sparse MNN 300B, no arrow is between $i_2$ and $o_1$, $i_1$ and $o_2$, and $i_4$ and $o_2$, which indicates that the weight values, $w_{21}$, $w_{12}$, and $w_{42}$ are zero.

Figure 4B:
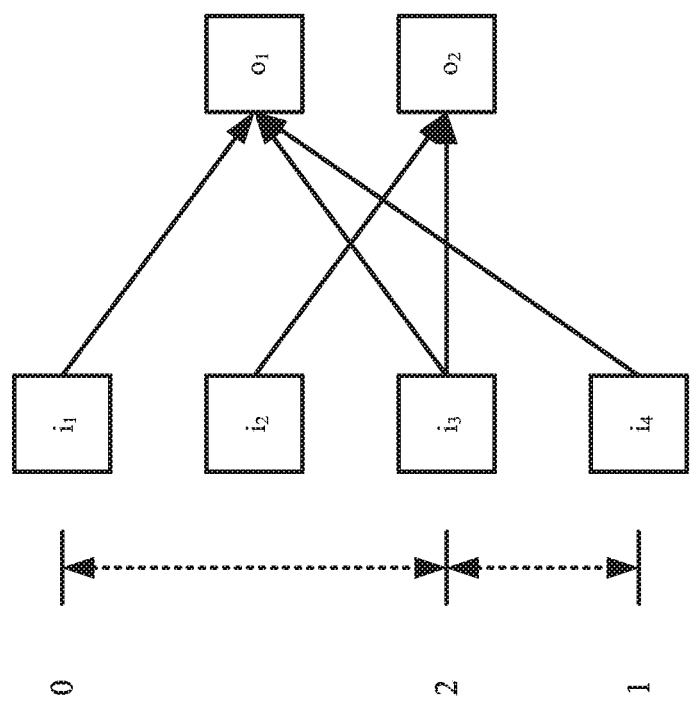
FIG. 4A and FIG. 4B are diagrams illustrating one or more connection values in a sparse MNN in which data modification for neural networks may be implemented.
Figure 4A:
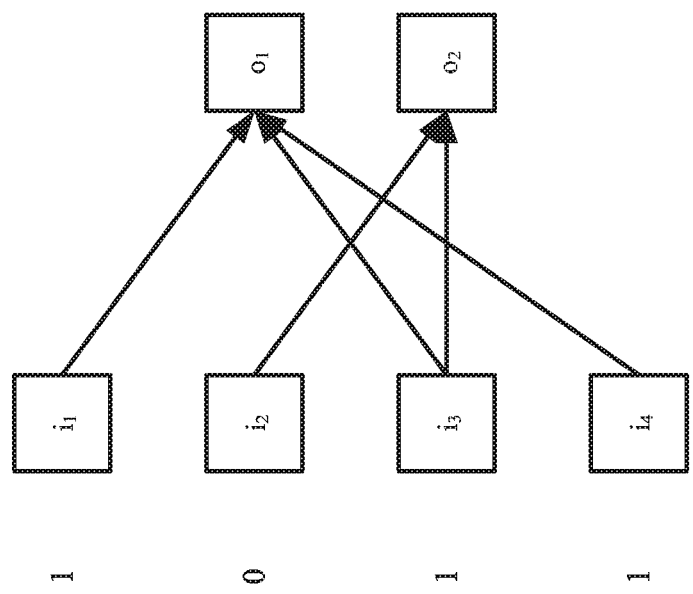

FIG. 4A and FIG. 4B are diagrams illustrating one or more connection values in a sparse MNN in which data modification for neural networks may be implemented. As discussed above, an index array that indicates the correspondence between the weight values and the input data is conventionally stored in the memory 208. With respect to sparse MNNs, connection data that indicate the correspondence between the output data and the input data may be generated and transmitted to MNN acceleration processor 206.

As depicted in FIGS. 4A and 4B, one or more groups of input data may be received at the input nodes $i_1$, $i_2$, $i_3$, and $i_4$. In other words, input data may be received and stored in a form of input array that includes elements identified by array indexes $i_1$, $i_2$, $i_3$, and $i_4$. Similarly, one or more groups of output data may be generated at output nodes $o_1$ and $o_2$. That is, the output data may be stored and transmitted in a form of output array that include elements identified by array indexes $o_1$ and $o_2$. As an example of a sparse MNN, some input nodes are not connected to the output nodes.

Connection data including one or more connection values may be generated based on the weight values corresponding to an output node and an input node. That is, if a weight value meets a predetermined condition, a connection value for the corresponding output node and input node may be set to one. Otherwise, if a weight value corresponding to the output node and input node is zero, or the weight value does not meet the predetermined condition, the connection value for the corresponding output node and input node may be set to zero. In some examples, the predetermined condition may include that, the weight value is a non-zero number, an absolute value of the weight value is less than or equal to a first threshold value, and/or the absolute value of the weight value is less than or equal to a second threshold value but greater than or equal to a third threshold value. The first, second, and third threshold values may be received from the peripheral devices via the I/O interface 202.

For example, the weight values for calculating output data at output node $o_1$ may include $w_{11}$, $w_{21}$, $w_{31}$, and $w_{41}$, which respective corresponds to the input data received at input nodes $i_2$, $i_3$, and $i_4$. The weight values ($w_{11}$, $w_{21}$, $w_{31}$, and $w_{41}$) may be 0.5, 0, 0.6, and 0.8 and the predetermined condition may be that a weight value is greater than zero but less than 0.99. Thus, weight values $w_{11}$, $w_{31}$, and $w_{41}$ meet the predetermined condition but $w_{21}$ does not. As such, the connection values for $i_1$ and $o_1$, $i_3$ and $o_1$, $i_4$ and $o_1$ may be set to 1 and the connection value for $i_2$ and $o_1$ may be set to zero. Similarly, the connection values for $i_1$ and $o_2$ and $i_4$ and $o_2$ may be set to zero and the connection values for $i_2$ and $o_2$ and $i_3$ and $o_2$ may be set to one. Thus, the connection values for o1 may be determined and stored to be (1, 0, 1, 1) and the connection values for o2 may be determined to be (0, 1, 1, 0). In some examples, the connection values may be stored in a form of a linked list or a multi-dimensional dynamic array.

In other examples (e.g., illustrated in FIG. 4B), connection values may be generated based on a distance between the input nodes. A connection value may be determined by the distances between different input nodes that correspond to those weight values that meet the predetermined condition. With respect to the above example weight values, $w_{11}$, $w_{31}$, and $w_{41}$ meet the predetermined condition. The connection value for input node $i_1$ may be set to a value equal to the distance between the first input node and the current input node. Thus, since the distance between input node $i_1$ and the first node (also $i_1$ here) is zero, the connection value for $i_1$ may be set to zero. With respect to input node $i_3$, since the distance between input node $i_3$ and the first input node ($i_1$) is 2, the connection value for $i_3$ may be set to 2. It is notable that the illustration and the term "distance" are provided for purpose of brevity. Since the input data and the output data may be stored in a form of data array, the term "distance" may refer to the difference between array indexes.

Thus, as the connection values sufficiently represent the connections between the input nodes and the output nodes, the MNN acceleration processor 206 is not required to retrieve the index array from the memory 208 during the forward propagation process and the backward propagation process described in FIG. 1.

Figure 5:
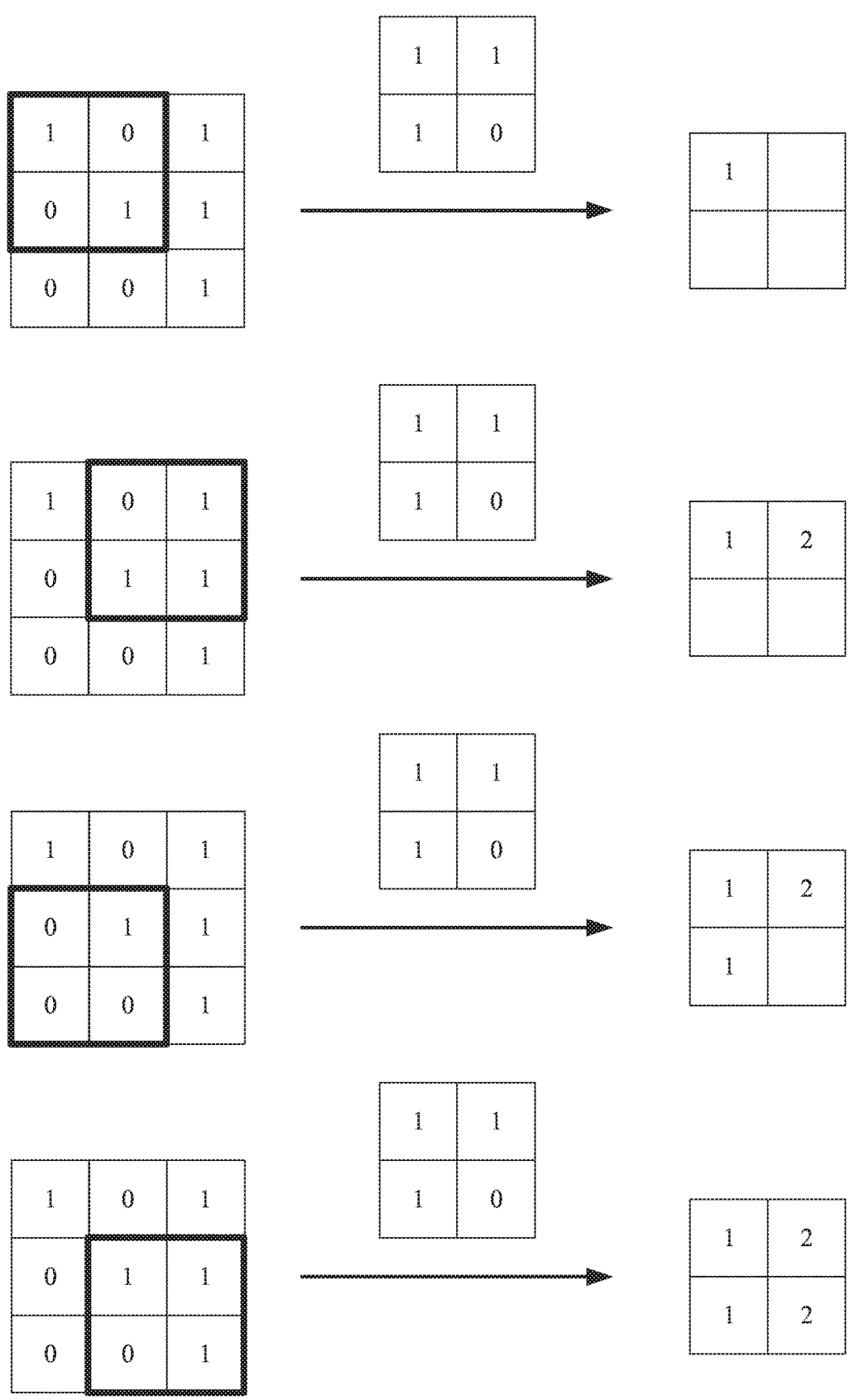
FIG. 5 is a diagram illustrating a convolution process with which data modification for neural networks may be implemented.

FIG. 5 is a diagram illustrating a convolution process with which data modification for neural networks may be implemented. In this example, an example convolution process between one or more groups of input data in a form of an input matrix $$\begin{matrix} 1 & 0 & 1 \\ 0 & 1 & 1 \\ 0 & 0 & 1 \end{matrix}$$

and weight values in a form of a weight matrix $$\begin{matrix} 1 & 1 \\ 1 & 0 \end{matrix}$$

is described. As shown, each element of the output matrix is calculated by convolving a portion of the input matrix with the weigh matrix. For example, the output data at the output node $o_1$ may be calculated by convolving the top left portion of the input matrix $$\left( \text{i.e.,} \begin{matrix} 1 & 0 \\ 0 & 1 \end{matrix} \right)$$

by the weight matrix. The result of the convolution process may be stored in an output matrix $$\left( \text{e.g.,} \begin{matrix} 1 & 2 \\ 1 & 2 \end{matrix} \text{ as shown} \right).$$

Figure 6:
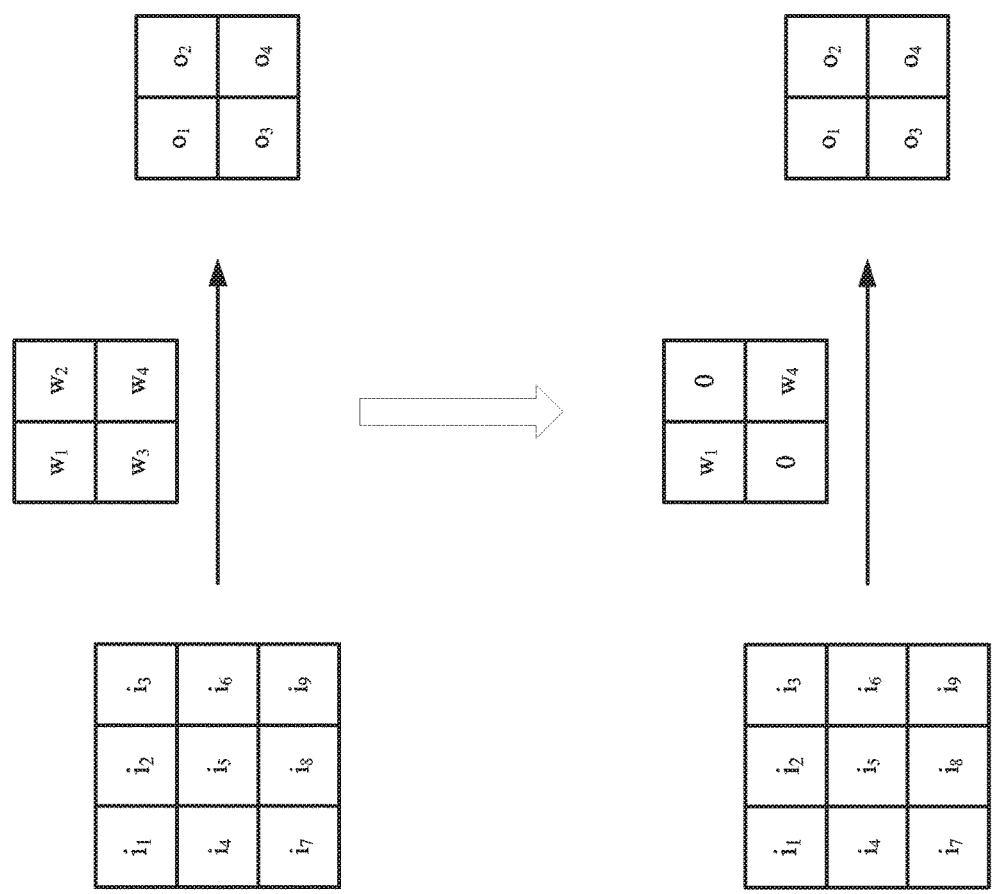
FIG. 6 is a diagram illustrating a convolution process with modified weight values with which data modification for neural networks may be implemented.

FIG. 6 is a diagram illustrating a convolution process with sparse weight matrix with which data modification for neural networks may be implemented. As depicted, the top part of FIG. 6 shows a convolution process between an input matrix and a weight matrix. The lower part of FIG. 6 shows a convolution process between the input matrix and a sparse weight matrix. In the sparse weight matrix, weight values w2 and w3 are deleted. Thus, rather than four times of convolution operations, it only requires two convolution operations to generate the output matrix. Specifically, the connection values $w_{11}$, and $w_{41}$, $w_{21}$, $w_{31}$, may be set to (1, 0, 0, 1) or (0, 2) for the calculation of output data at output nodes $o_1$ and $o_4$.

Figure 7:
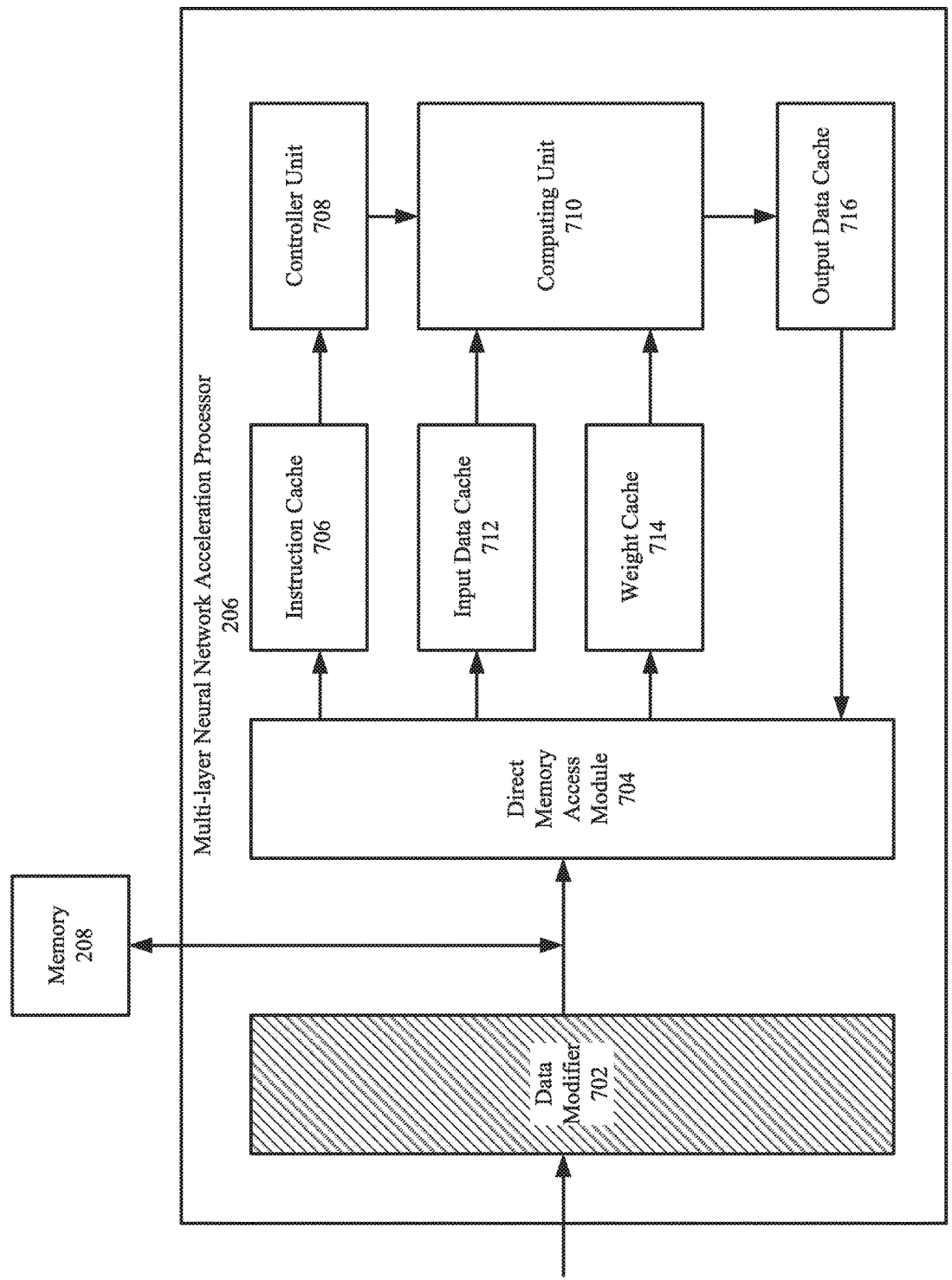
FIG. 7 is a block diagram illustrating an example MNN acceleration processor in which data modification for neural networks may be implemented.

FIG. 7 is a block diagram illustrating an example MNN acceleration processor 206 in which data modification for neural networks may be implemented. As depicted, MNN acceleration processor 206 may at least include a data modifier 702 configured to receive one or more groups of input data and a predetermined weight value array that includes one or more weight values. As described above, the one or more groups of input data may be stored in a form of data array ("input array" hereinafter); that is, each group of the input data may be stored as an element of the input array ("input element" hereinafter). Each input element may be identified by an array index ("input array index" hereinafter; e.g., $i_1$, $i_2$, $i_3$, and $i_4$). Each of the weight values may be designated for calculating a group of output data at an output node (e.g., $o_1$) based on a respective group of input data (e.g., a group of input data received at the input node $i_1$). The calculated output data may be similarly stored in a form of data array ("output array" hereinafter); that is, each group of the output data may be stored as an element of the output array ("output element" hereinafter). Each output element may be identified by an array index ("output array index" hereinafter; e.g., $o_1$ and $o_2$).

The data modifier 702 may be configured to further receive connection data that include the one or more aforementioned connection values. Each of the connection values may correspond to an input array index (e.g., $i_2$) and an output array index (e.g., $o_1$).

Further, the data modifier 702 may be configured to modify the input data and the weight values based on the connection values. In some aspects, the data modifier 702 may be configured to operate in a work mode to delete one or more weight values or one or more groups of the input data ("pruning mode"). Additionally, the data modifier 702 may be configured to operate in another work mode to add one or more zero values to the predetermined weight value array or the input data ("compensation mode"). The selection between the deletion mode or the compensation mode may be predetermined as a system parameter or according to other algorithms prior to the receiving of the input data.

In a specific example, the data modifier 702 may receive an input array including groups of input data (0.5, 0.6, 0.7, 1.2, 4, 0.1), an array of connection values (1, 0, 0, 1, 1, 1), a predetermined weight value array including weight values (0.5, 0.8, 0.9, 0.4). Conventionally, when a processor performs multiplication or convolution operations on the six-element input array and the four-element weight array, the processor retrieves the index array from the memory 208 to determine which four elements of the input array should be multiplied or convolved by the four elements in the weight array. The retrieving of the index array, as previously discussed, likely causes bandwidth consumption.

In this example, the data modifier 702 may be configured to operate in the pruning mode. That is, since the second and the third connection values are zeroes, the data modifier 702 may be configured to delete the corresponding groups of the input data, i.e., the second and the third groups of the input data (0.6 and 0.7). The modified input data may be stored as an array including elements (0.5, 1.2, 4, 0.1). The modified input data may then be transmitted to a direct memory access (DMA) module 704. Alternatively, the modified input data may be transmitted to and stored at the memory 208 for future processing.

In another specific example where the data modifier 702 operates in the pruning mode, the data modifier 702 may receive groups of input data in an input array (0.5, 1.2, 4, 0.1), a predetermined weight value array including weight values (0.5, 0, 0, 0.8, 0.9, 0.4), and the same array of connection values. Since the second and the third connection values are zeroes, the data modifier 702 may be configured to delete the corresponding weight values from the predetermined weight value array. That is, the second and the third weight values in the predetermined weight value array. The modified weight value array may be stored as an array including elements (0.5, 0.8, 0.9, 0.4). Similarly, the modified weight value array may be transmitted to the DMA module 704 or to the memory 208.

In some other examples, the data modifier 702 may be configured to operate in the compensation mode. For example, the data modifier 702 may receive an input array including elements (0.5, 1.2, 4, 0.1), a predetermined weight value array including weight values (0.5, 0, 0, 0.8, 0.9, 0.4), and the same connection data including connection values (1, 0, 0, 1, 1, 1). Since the second and the third connection values are zeroes, the data modifier 702 may be configured to add two elements of zero value to the input array to be the second and the third elements of the input array generating a modified input array including elements (0.5, 0, 0, 1.2, 4, 0.1). For the same reason stated above, a processor that performs multiplication or convolution operations on the modified input array and the predetermined weight value array is not required to retrieve the index array from the memory 208 and, thus, bandwidth consumption may be reduced.

In another example where the data modifier 702 operates in the compensation mode, the data modifier 702 may receive an input array including elements (0.5, 0.6, 0.7, 1.2, 4, 0.1), a predetermined weight value array including elements (0.5, 0.8, 0.9, 0.4), and the same connection data including connection values (1, 0, 0, 1, 1, 1). Since the second and the third connection values are zeroes, the data modifier 702 may be configured to add two elements of zero value to be the second and the third elements of the predetermined weight value array generating a modified weight value array including elements (0.5, 0, 0, 0.8, 0.9, 0.4).

The modified input data and/or the modified weight values may be transmitted to and temporarily stored in an input data cache 712 and/or a weight cache 714. The input data cache 712 and weight cache 714 may refer to one or more high-speed storage devices incorporated within the MNN acceleration processor 206 and configured to store the input data and the weight values respectively. The modified input data and/or the modified weight values may be further transmitted to a computing unit 710 for further processing.

MNN acceleration processor 206 may further include an instruction cache 706 and a controller unit 708. The instruction cache 706 may refer one or more storage devices configured to store instructions received from the CPU 204. The controller unit 708 may be configured to read the instructions from the instruction cache 706 and decode the instructions.

Upon receiving the decoded instructions from the controller unit 708, the modified input data from the input data cache 712, and the modified weight values from the weight cache 714, the computing unit 710 may be configured to calculate one or more groups of output data based on the modified weight values and the modified input data. In some aspects, the calculation of the output data may include the forward propagation process and the backward propagation process described in accordance with FIG. 1.

The computing unit 710 may further include one or more multipliers configured to multiply the modified input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

The generated output data may be temporarily stored in an output data cache 716 and may be further transmitted to the memory 208 via the DMA module 704.

Figure 8:
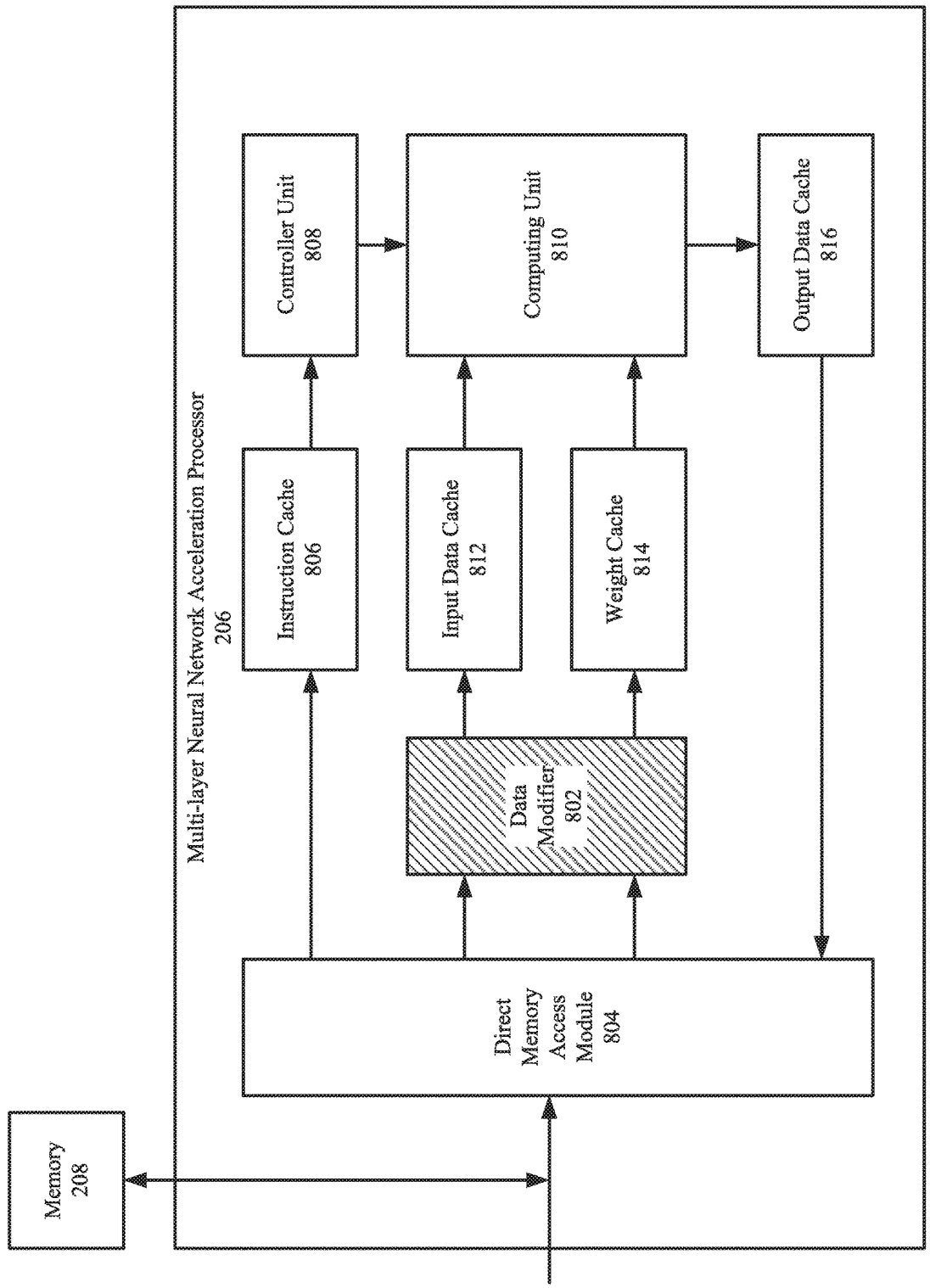
FIG. 8 is a block diagram illustrating another example MNN acceleration processor in which data modification for neural networks may be implemented.

FIG. 8 is a block diagram illustrating another example MNN acceleration processor 206 in which data modification for neural networks may be implemented. As depicted, components in the example MNN acceleration processor 206 may be the same or similar to the corresponding components shown in FIG. 7 or may be configured to perform the same or similar operations to those shown in FIG. 7 except that a data modifier 802 may be implemented between a DMA module 804, an input data cache 812, and a weight cache 814.

The data modifier 802, similar to the data modifier 702, may be configured to modify the input data and the weight values based on the connection values. The modified input data and the modified weight values may be transmitted to an input data cache 812 and a weight cache 814 and may be further transmitted to a computing unit 810 for further processing.

Figure 9:
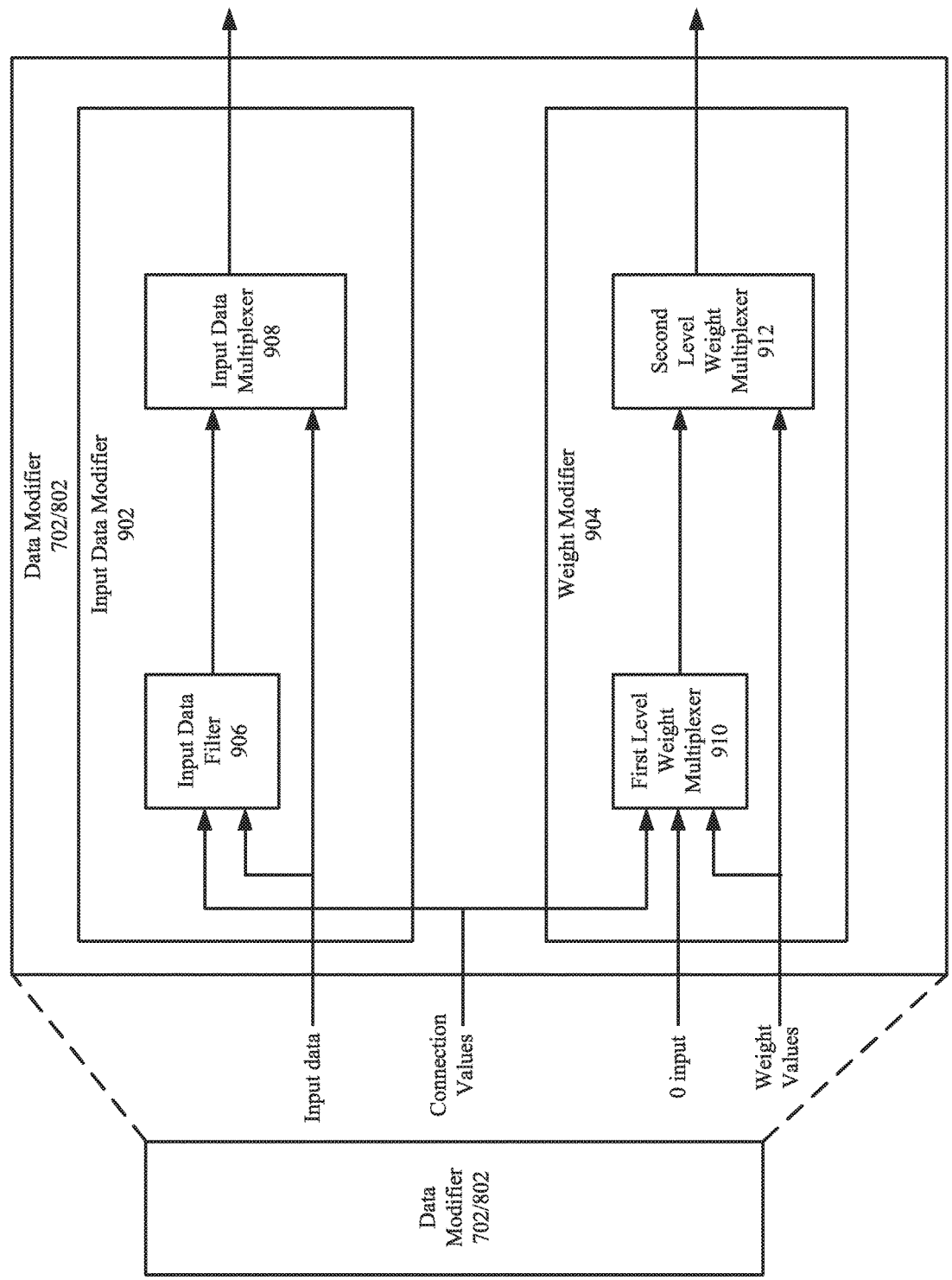
FIG. 9 is a block diagram illustrating an example data modifier by which data modification for neural networks may be implemented.

FIG. 9 is a block diagram illustrating an example data modifier 702/802 by which data modification for neural networks may be implemented. As depicted, the data modifier 702/802 may include an input data modifier 902 and a weight modifier 904.

Depending on the operation mode, the input data modifier 902 may be configured to modify the input data. When operates in the pruning mode, the input data modifier 902 may be configured to delete groups of input data that correspond to the connection values that are zeroes. When operates in the compensation mode, the input data modifier 902 may be configured to add one or more zeroes to be the elements corresponding to the connection values that are zeroes.

Similarly, the weight modifier 904 may be configured to modify the weight values based on different operation mode. When operates in the pruning mode, the weight modifier 904 may be configured to delete weight values that correspond to the connection values that are zeroes. When operates in the compensation mode, the weight modifier 904 may be configured to add one or more zeroes to be the elements corresponding to the connection values that are zeroes.

In some aspects, the input data modifier 902 and the weight modifier 904 may be implemented by one or more multiplexers and at least one storage device configured to store information indicating the current operation mode.

In a non-limiting example illustrated in FIG. 9, the input data modifier 902 may include an input data filter 906 and an input data multiplexer 908. The input data filter 906 may be configured to output an input element if a connection value corresponding to the input element is 1. Further, when the connection value is 0, the input data filter 906 may be configured to ignore the corresponding input element and move to process the next input element. The input data multiplexer 908 may be configured to output data from the input data filter 906 when in the pruning mode and to directly output the input data when in the compensation mode. As such, those input elements corresponding to the connection values of zero may be deleted when the input data modifier 902 is configured to work in the pruning mode.

Further to the above non-limiting example, the weight modifier 904 may include a first level weight multiplexer 910 and a second level weight multiplexer 912. The first level weight multiplexer 910 may be configured to output a zero value if a corresponding connection value is 0 and to output a weight value corresponding to the connection value if the connection value is 1. The second level weight multiplexer 912 may be configured to output data received from the first level weight multiplexer 910 when in the compensation mode. Further, the second level weight multiplexer 912 may be configured to directly output a corresponding weight value when in the pruning mode. As such, additional elements of zero values may be added to the weight value array when the weight modifier 904 is configured to work in the compensation mode.

Figure 10:
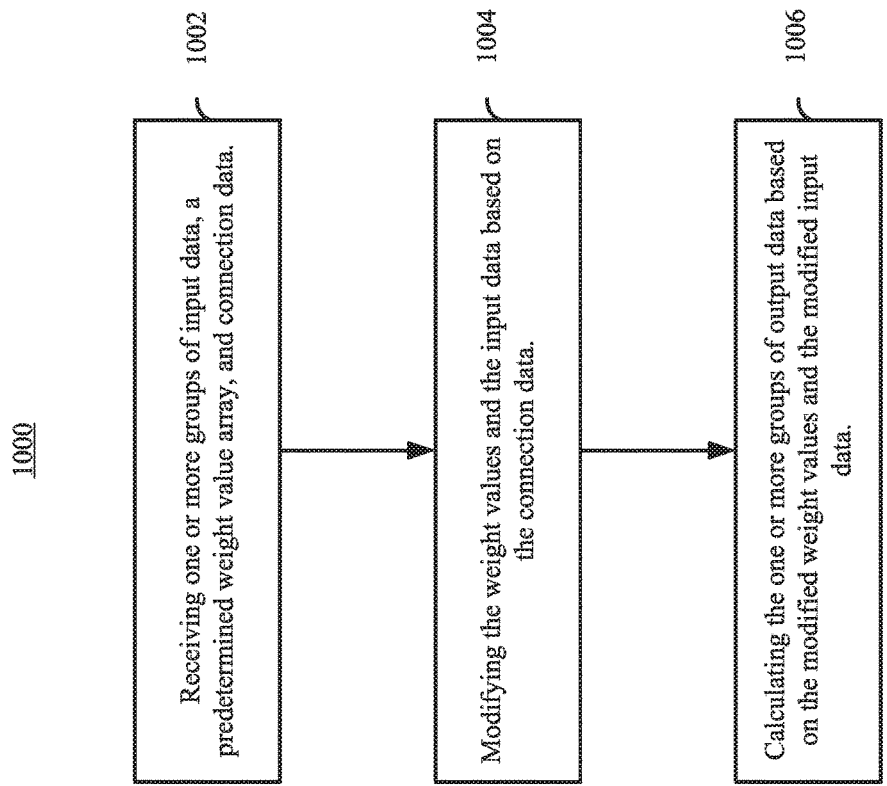
FIG. 10 is a flow chart of aspects of an example method for modifying data for neural networks.

FIG. 10 is a flow chart of aspects of an example method 1000 for modifying data for neural networks. The example method 1000 may be performed by one or more components of the MNN acceleration processor 206 as described in FIGS. 7 and 8 and the components of the data modifier 702/802 as described in FIG. 9.

At block 1002, method 1000 may include the data modifier 702/802 receiving one or more groups of input data, wherein the one or more groups of input data are stored as input elements in an input array and each of the input elements is identified by an input array index.

Further, method 1000 may include the data modifier 702/802 receiving a predetermined weight value array that includes one or more weight values for calculating one or more groups of output data based on the one or more groups of input data, wherein the one or more groups of output data are to be stored as output elements in an output array and each of the output elements is identified by an output array index.

Further still, method 1000 may include the data modifier 702/802 receiving connection data that include one or more connection values, wherein each of the connection values corresponds to one of the input array indexes and one of the output array indexes and indicates whether one of the weight values in the predetermined weight value array is designated for calculating a group of the output data to be stored as the output element identified by the corresponding output array index based on a group of the input data stored as the input element identified by the corresponding input array index, and whether the weight value meets a predetermined condition.

At block 1004, method 1000 may include the data modifier 702/802 modifying the weight values and the input data based on the connection data. In some aspects, the modifying may further includes sub-processes or sub-operations including deleting at least one weight values that correspond to the connection values that are zero, adding one or more zero values to the predetermined weight value array based on the connection values, deleting at least one groups of the input data that are stored as the input elements identified by the input array indexes corresponding to the connection values that are zero, or adding one or more zero values to the input elements identified by the input array indexes corresponding to the connection values that are zero.

In a specific example, the data modifier 702 may receive an input array including groups of input data (0.5, 0.6, 0.7, 1.2, 4, 0.1), an array of connection values including elements (1, 0, 0, 1, 1, 1), a predetermined weight value array including weight values (0.5, 0.8, 0.9, 0.4). In this example, the data modifier 702 may be configured to operate in the pruning mode. That is, since the second and the third connection values are zeroes, the data modifier 702 may be configured to delete the corresponding groups of the input data, i.e., the second and the third groups of the input data (0.6 and 0.7). The modified input data may be stored as an array including elements (0.5, 1.2, 4, 0.1).

In another specific example where the data modifier 702 operates in the pruning mode, the data modifier 702 may receive groups of input data in an input array (0.5, 1.2, 4, 0.1), a predetermined weight value array including weight values (0.5, 0, 0, 0.8, 0.9, 0.4), and the same array of connection values. Since the second and the third connection values are zeroes, the data modifier 702 may be configured to delete the corresponding weight values from the predetermined weight value array. That is, the second and the third weight values in the predetermined weight value array. The modified weight value array may be stored as an array including elements (0.5, 0.8, 0.9, 0.4).

At block 1006, method 1000 may include the computing unit 710/810 calculating the one or more groups of output data based on the modified weight values and the modified input data. That is, the computing unit 710 may be configured to calculating one or more groups of output data based on the modified weight values and the modified input data. In some aspects, the computing unit 710 may further include one or more multipliers configured to multiply the modified input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

Figure 11:
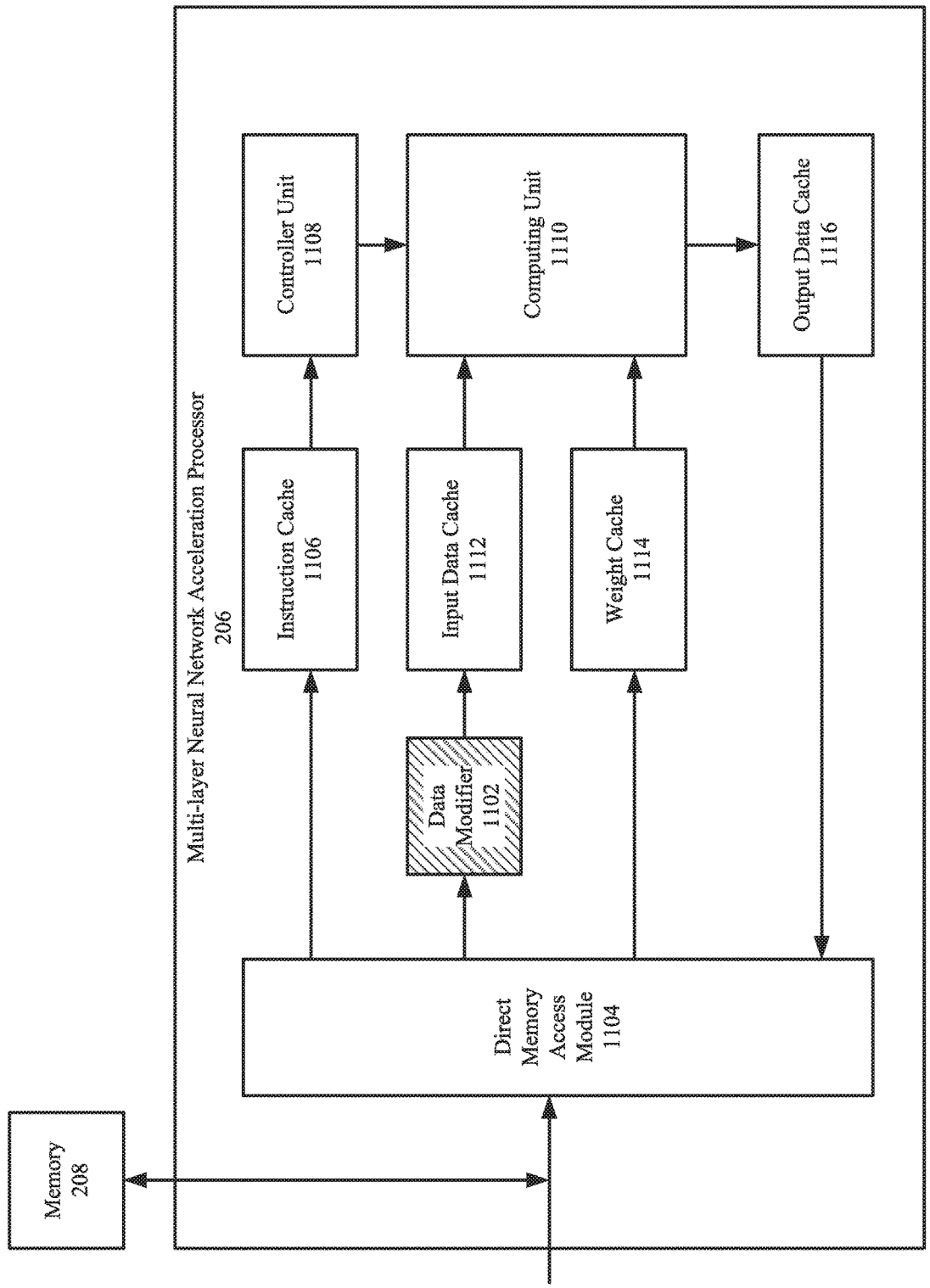
FIG. 11 is a block diagram illustrating another example MMN acceleration processor in which data modification for neural networks may be implemented.

FIG. 11 is a block diagram illustrating another example MMN acceleration processor 206 in which data modification for neural networks may be implemented. As depicted, components in the example MNN acceleration processor 206 may be the same or similar to the corresponding components shown in FIG. 7 or may be configured to perform the same or similar operations to those shown in FIG. 7 except that a data modifier 1102 may be implemented between a DMA module 1104 and an input data cache 1112. For example, the DMA module 1104 may be configured to transmit and receive data from and to the memory 208, an instruction cache 1106, the data modifier 1102, a weight cache 1114, and an output data cache 1116. The instruction cache 1106, the input data cache 1112, the weight cache 1114, and the output data cache 1116 may respectively refer to one or more high-speed storage devices incorporated within the MNN acceleration processor 206 and configured to respectively store instructions from the DMA module 1104, the modified input data from the data modifier 1102, weight values from the DMA module 1104, and the calculated output data from a computing unit 1110.

In this example, the data modifier 1102 may be configured to receive one or more groups of input data for generating one or more groups of output data. The one or more groups of input data may be stored as input elements in an input array and each of the input elements is identified by an input array index. The data modifier 1102 may be further configured to receive connection data that include one or more connection values. In this example, unlike the data modifier 702/802, the data modifier 1102 is not configured to receive the weight values as the weight values are directly transmitted from the DMA module 1104 to the weight cache 1114.

Upon receiving the input data and the connection data, the data modifier 1102 may be configured to modify the received groups of input data based on the connection data. For example, the data modifier 1102 may be configured to receive an input array including groups of input data as elements (0.5, 0.6, 0.7, 1.2, 4, 0.1) and an array of connection values (1, 0, 0, 1, 1, 1). When the data modifier 1102 operates in the pruning mode, the data modifier 1102 may be configured to delete the corresponding groups of the input data, i.e., the second and the third groups of the input data (0.6 and 0.7). The modified input data may be stored as an array including elements (0.5, 1.2, 4, 0.1).

In some other aspects, the data modifier 1102 may operate in the compensation mode. For example, the data modifier 1102 may receive an input array including elements (0.5, 1.2, 4, 0.1) and the same connection data including connection values (1, 0, 0, 1, 1, 1). Since the second and the third connection values are zeroes, the data modifier 1102 may be configured to add two elements of zero value to the input array to be the second and the third elements of the input array generating a modified input array including elements (0.5, 0, 0, 1.2, 4, 0.1).

In this example, the modified input data may be transmitted to and temporarily stored at the input data cache 1112. The modified input data may be further transmitted, together with the weight values from the weight cache 1114 and the decoded instructions from the controller unit 1108, to the computing unit 1110. The computing unit 1110 may be configured to calculate one or more groups of output data based on the weight values and the modified input data. In some aspects, the calculation of the output data may include the forward propagation process and the backward propagation process described in accordance with FIG. 1.

Similar to the computing unit 710, the computing unit 1110 may include one or more multipliers configured to multiply the modified input data by the weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data. The generated output data may be temporarily stored in the output data cache 1116 and may be further transmitted to the memory 208 via the DMA module 1104.

Figure 12:
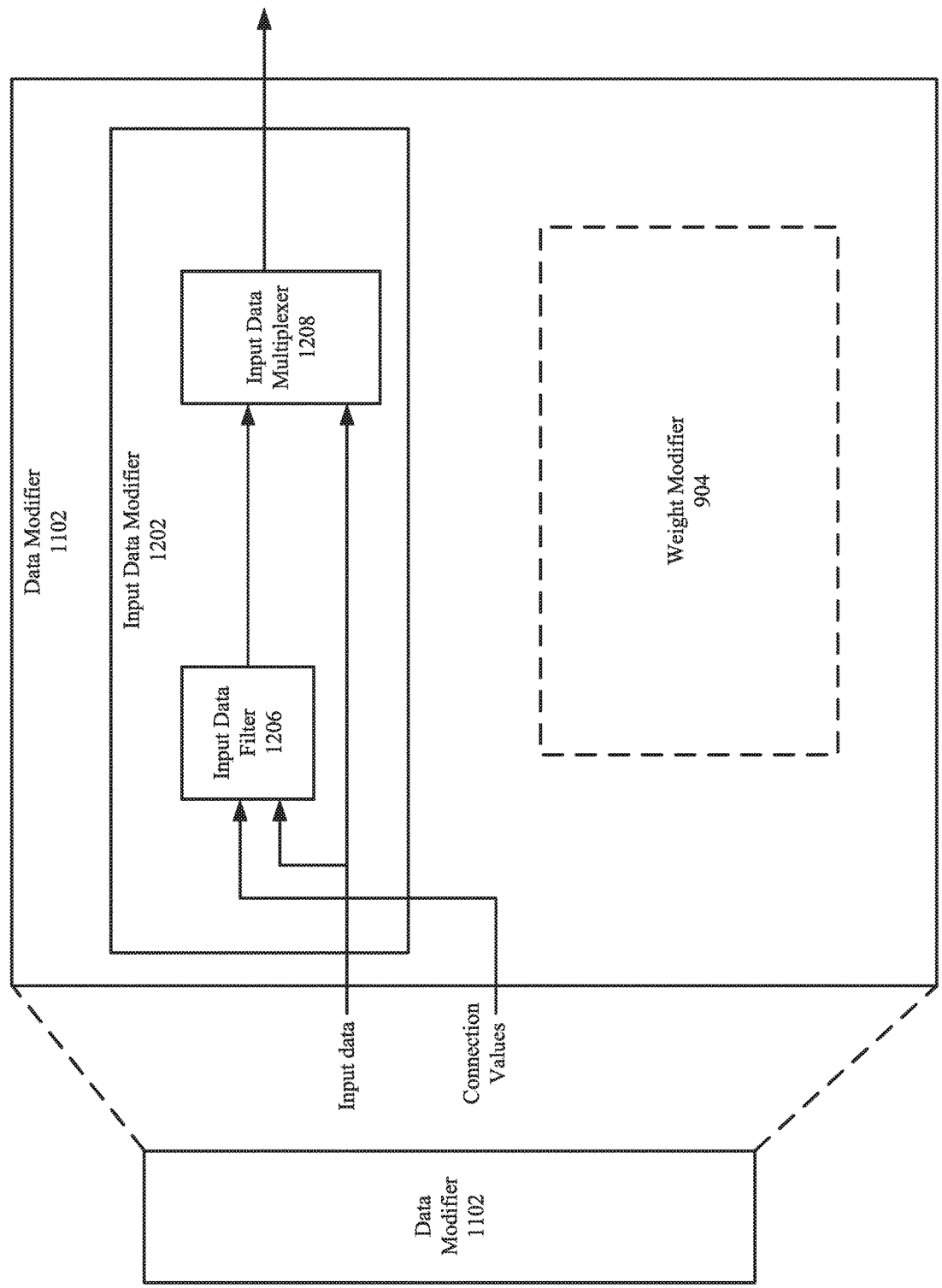
FIG. 12 is a block diagram illustrating another example data modifier by which data modification for neural networks may be implemented.

FIG. 12 is a block diagram illustrating another example data modifier 1102 by which data modification for neural networks may be implemented. As the data modifier 1102 may be configured to only modify the input data, the data modifier 1102 may only include an input data modifier 1202. The dash-lined block indicates an optional weight modifier 904.

Similar to the input data modifier 902, the input data modifier 1202 may be configured to modify the input data depending on the operation mode. When operates in the pruning mode, the input data modifier 1202 may be configured to delete groups of input data that correspond to the connection values that are zeroes. When operates in the compensation mode, the input data modifier 1202 may be configured to add one or more zeroes to be the elements corresponding to the connection values that are zeroes.

In some aspects, the input data modifier 1202 may be implemented by one or more multiplexers and at least one storage device configured to store information indicating the current operation mode.

In a non-limiting example illustrated in FIG. 12, the input data modifier 1202 may include an input data filter 1206 and an input data multiplexer 1208. The input data filter 1206 may be configured to output an input element if a connection value corresponding to the input element is 1. Further, when the connection value is 0, the input data filter 1206 may be configured to ignore the corresponding input element and move to process the next input element. The input data multiplexer 1208 may be configured to output data from the input data filter 1206 when in the pruning mode and to directly output the input data when in the compensation mode. As such, those input elements corresponding to the connection values of zero may be deleted when the input data modifier 1202 is configured to work in the pruning mode.

Figure 13:
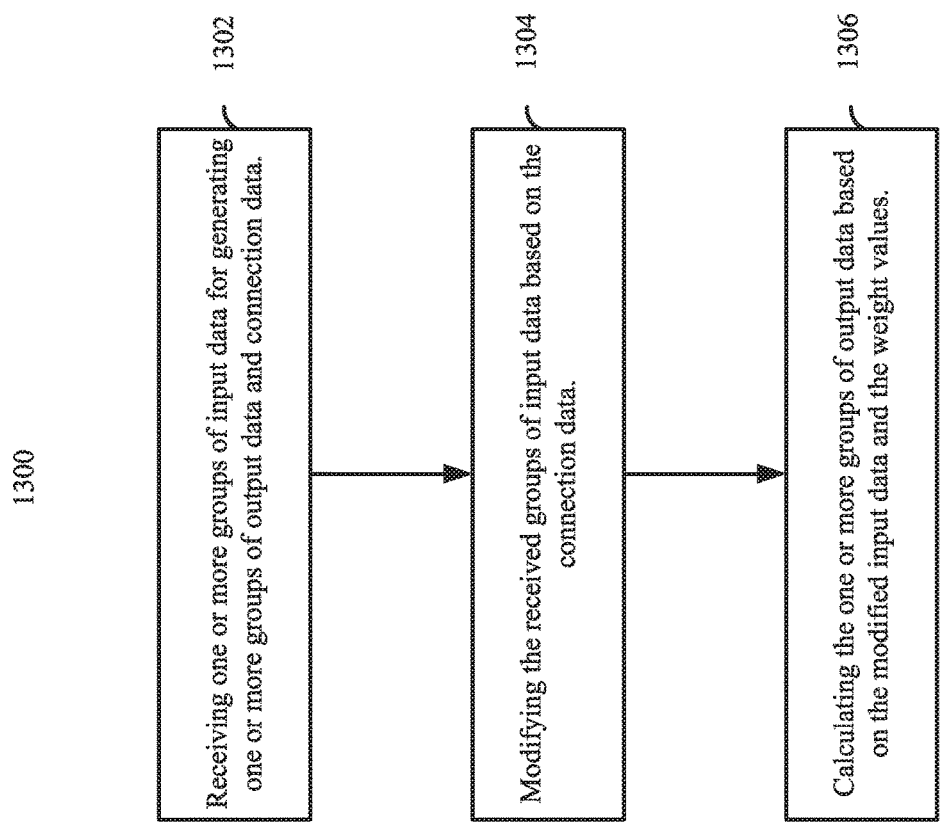
FIG. 13 is a flow chart of aspects of another example method for modifying data for neural networks.

FIG. 13 is a flow chart of aspects of another example method 1300 for modifying data for neural networks. The example method 1300 may be performed by one or more components of the MNN acceleration processor 206 as described in FIG. 11 and the component of the data modifier 1102 as described in FIG. 12.

At the block 1302, method 1300 may include the data modifier 1102 receiving one or more groups of input data for generating one or more groups of output data. As previously described, the one or more groups of input data may be stored as input elements in an input array and each of the input elements is identified by an input array index. Method 1300 may further include the data modifier 1102 receiving connection data that include one or more connection values.

At the block 1304, method 1300 may include the data modifier 1102 modifying the received groups of input data based on the connection data. In some aspects, the modifying may further include sub-processes or sub-operations including deleting at least one groups of the input data that are stored as the input elements identified by the input array indexes corresponding to the connection values that are zero when the data modifier 1102 operates in the pruning mode. In some other aspects, the modifying may include adding one or more zero values to the input elements identified by the input array indexes corresponding to the connection values that are zero when the data modifier 1102 operates in the compensation mode.

In a specific example, the data modifier 1102 may receive an input array including groups of input data as elements (0.5, 0.6, 0.7, 1.2, 4, 0.1) and an array of connection values (1, 0, 0, 1, 1, 1). When the data modifier 1102 operates in the pruning mode, the data modifier 1102 may be configured to delete the corresponding groups of the input data, i.e., the second and the third groups of the input data (0.6 and 0.7). The modified input data may be stored as an array including elements (0.5, 1.2, 4, 0.1).

In another example, the data modifier 1102 may operate in the compensation mode. For example, the data modifier 1102 may receive an input array including elements (0.5, 1.2, 4, 0.1) and the same connection data including connection values (1, 0, 0, 1, 1, 1). Since the second and the third connection values are zeroes, the data modifier 1102 may be configured to add two elements of zero value to the input array to be the second and the third elements of the input array generating a modified input array including elements (0.5, 0, 0, 1.2, 4, 0.1).

At the block 1306, method 1300 may include the computing unit 1110 calculating the one or more groups of output data based on the weight values and the modified input data. In some aspects, the computing unit 1110 may include one or more multipliers configured to multiply the modified input data by the weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

Figure 14:
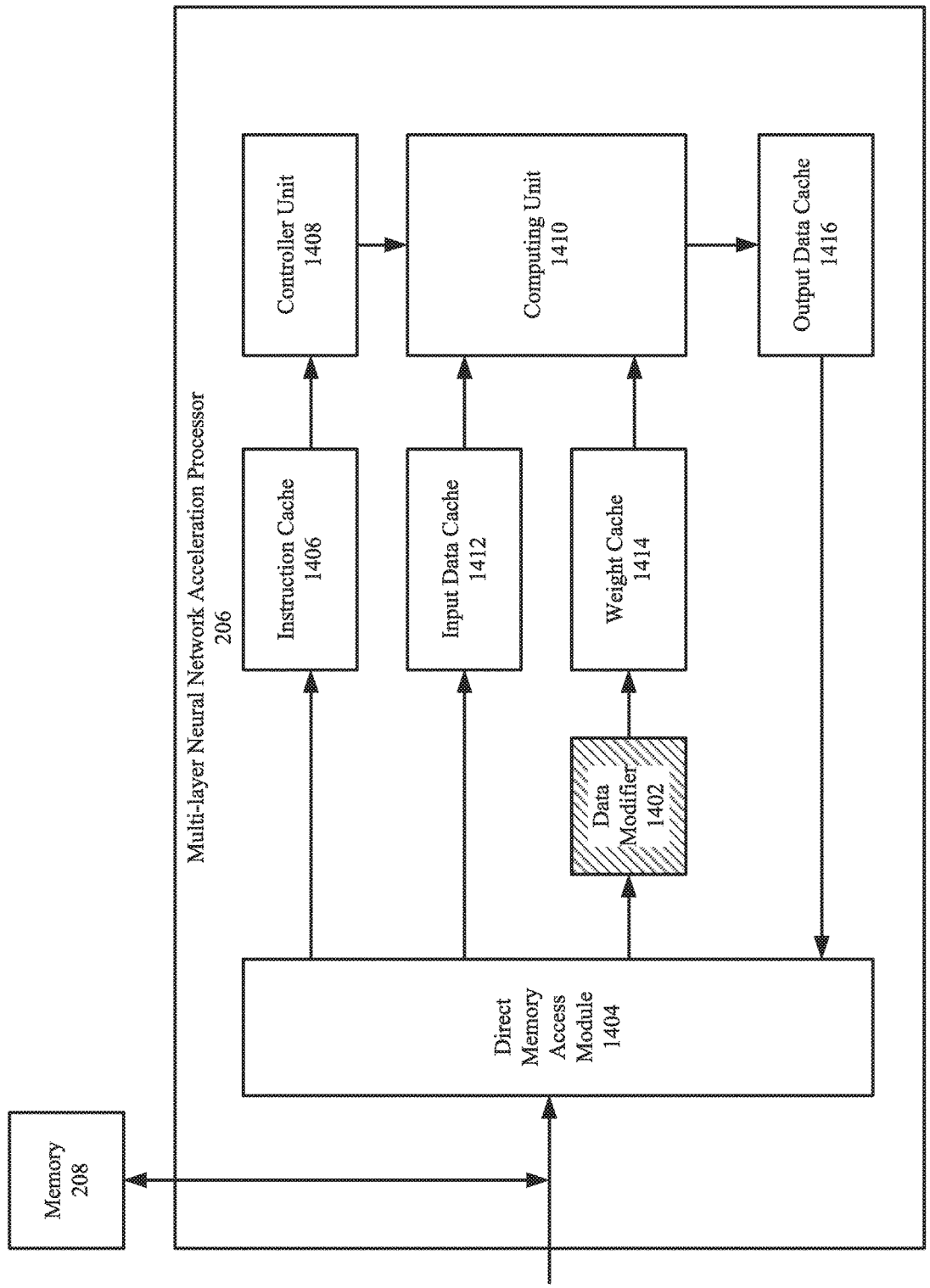
FIG. 14 is a block diagram illustrating another example MMN acceleration processor in which data modification for neural networks may be implemented.

FIG. 14 is a block diagram illustrating another example MMN acceleration processor 206 in which data modification for neural networks may be implemented. As depicted, components in the example MNN acceleration processor 206 may be the same or similar to the corresponding components shown in FIG. 7 or may be configured to perform the same or similar operations to those shown in FIG. 7 except that a data modifier 1402 may be implemented between a DMA module 1404 and a weight cache 1414. For example, the DMA module 1404 may be configured to transmit and receive data from and to the memory 208, an instruction cache 1406, the data modifier 1402, an input data cache 1412, and an output data cache 1416. The instruction cache 1406, the input data cache 1412, the weight cache 1414, and the output data cache 1416 may respectively refer to one or more high-speed storage devices incorporated within the MNN acceleration processor 206 and configured to respectively store instructions from the DMA module 1404, the input data from the DMA module 1404, the modified weight values from the data modifier 1402, and the calculated output data from a computing unit 1410.

In this example, the data modifier 1402 may be configured to receive a predetermined weight value array that includes one or more weight values for calculating one or more groups of output data based on one or more groups of input data. The one or more groups of input data may be stored as input elements in an input array and each of the input elements is identified by an input array index. The one or more groups of output data are to be stored as output elements in an output array and each of the output elements is identified by an output array index. The data modifier 1402 may be further configured to receive connection data that include one or more connection values. In this example, unlike the data modifier 702/802, the data modifier 1402 is not configured to receive the input data as the input data may be directly transmitted from the DMA module 1404 to the input data cache 1412.

Upon receiving the weight values and the connection data, the data modifier 1402 may be configured to modify the weight values based on the connection data. For example, the data modifier 1402 may receive a predetermined weight value array including weight values (0.5, 0, 0, 0.8, 0.9, 0.4) and an array of connection values (1, 0, 0, 1, 1, 1). Since the second and the third connection values are zeroes, the data modifier 1402 may be configured to delete the corresponding weight values from the predetermined weight value array. That is, the second and the third weight values in the predetermined weight value array. The modified weight value array may be stored as an array including elements (0.5, 0.8, 0.9, 0.4).

In another example, the data modifier 1402 may receive a predetermined weight value array including elements (0.5, 0.8, 0.9, 0.4) and the same connection data including connection values (1, 0, 0, 1, 1, 1). Since the second and the third connection values are zeroes, the data modifier 1402 may be configured to add two elements of zero value to be the second and the third elements of the predetermined weight value array generating a modified weight value array including elements (0.5, 0, 0, 0.8, 0.9, 0.4).

The modified weight values may be transmitted to and temporarily stored at the weight cache 1414. The modified weight values may be further transmitted, together with the input data from the input data cache 1412 and the decoded instructions from the controller unit 1408, to the computing unit 1410. The computing unit 1410 may be further configured to calculate one or more groups of output data based on the modified weight values and the input data. In some aspects, the calculation of the output data may include the forward propagation process and the backward propagation process described in accordance with FIG. 1.

Similar to the computing unit 710, the computing unit 1410 may include one or more multipliers configured to multiply the input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data. The generated output data may be temporarily stored in the output data cache 1416 and may be further transmitted to the memory 208 via the DMA module 1404.

Figure 15:
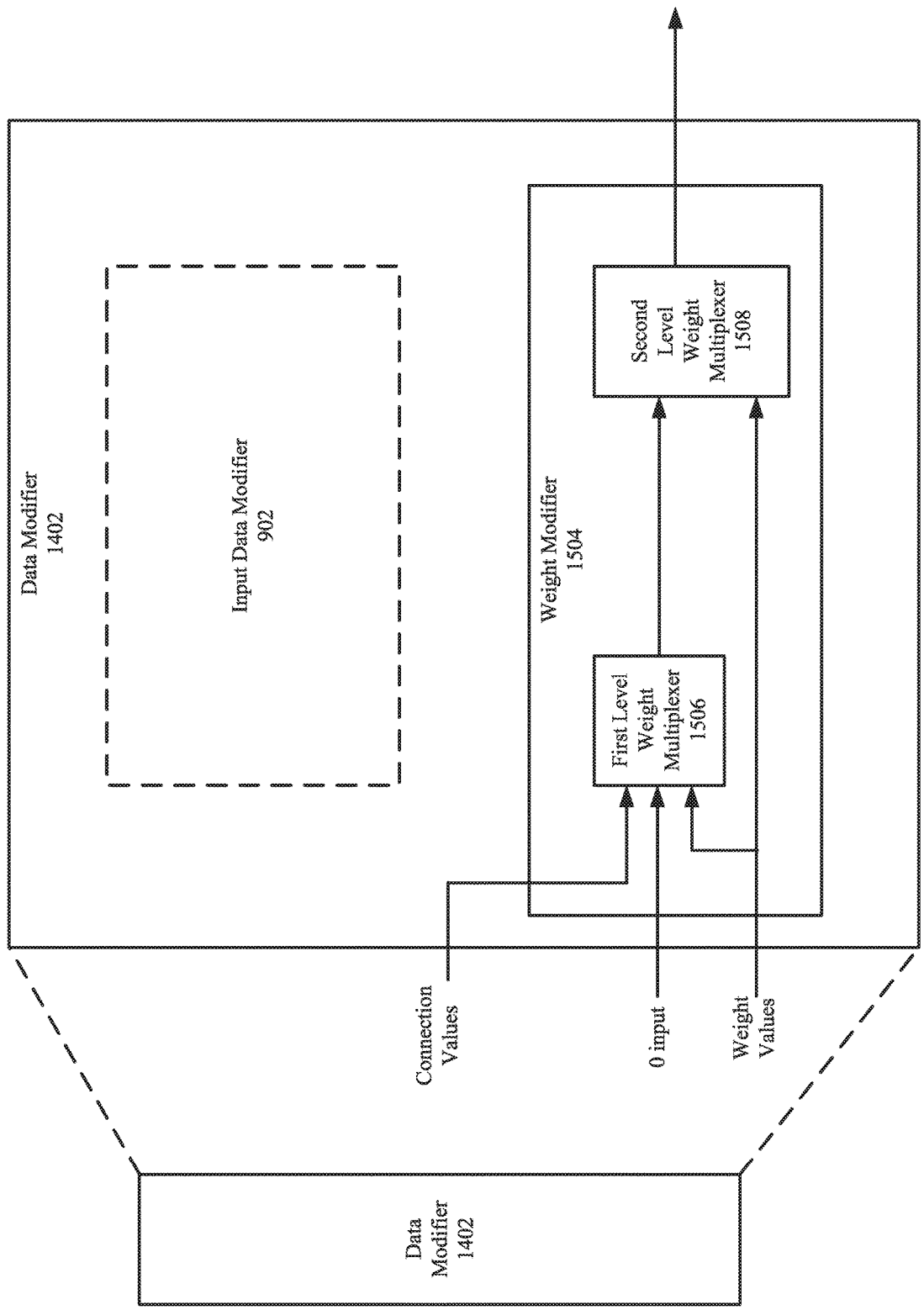
FIG. 15 is a block diagram illustrating another example data modifier by which data modification for neural networks may be implemented.

FIG. 15 is a block diagram illustrating another example data modifier by which data modification for neural networks may be implemented. As the data modifier 1402 may be configured to only modify the weight values, the data modifier 1402 may only include a weight modifier 1504. The dash-lined block indicates an optional input data modifier 902.

Similar to the weight modifier 904, the weight modifier 1504 may be configured to modify the input data depending on the operation mode. When operates in the pruning mode, the weight modifier 1504 may be configured to delete weight values that correspond to the connection values that are zeroes. When operates in the compensation mode, the weight modifier 1504 may be configured to add one or more zeroes to be the elements corresponding to the connection values that are zeroes.

In some aspects, the weight modifier 1504 may be implemented by one or more comparators and at least one storage device configured to store information indicating the current operation mode.

In a non-limiting example illustrated in FIG. 15, the weight modifier 1504 may include a first level weight multiplexer 1506 and a second level weight multiplexer 1508. The first level weight multiplexer 1506 may be configured to output a zero value if a corresponding connection value is 0 and to output a weight value corresponding to the connection value if the connection value is 1. The second level weight multiplexer 1508 may be configured to output data received from the first level weight multiplexer 1506 when in the compensation mode. Further, the second level weight multiplexer 1508 may be configured to directly output a corresponding weight value when in the pruning mode. As such, additional elements of zero values may be added to the weight value array when the weight modifier 1504 is configured to work in the compensation mode.

FIG. 16 is a flow chart of aspects of another example method for modifying data for neural networks. The example method 1600 may be performed by one or more components of the MNN acceleration processor 206 as described in FIG. 14 and the component of the data modifier 1402 as described in FIG. 15.

At block 1602, method 1600 may include the data modifier 1402 receiving a predetermined weight value array that includes one or more weight values for calculating one or more groups of output data based on one or more groups of input data. Method 1600 may further include the data modifier 1402 receiving connection data that include one or more connection values.

At block 1604, method 1600 may include the data modifier 1402 modifying the weight values based on the connection data. In some aspects, the modifying may further include sub-processes or sub-operations including deleting at least one weight values that correspond to the connection values that are zero when the data modifier 1402 operates in the pruning mode. In some other aspects, the modifying may include adding one or more zero values to the predetermined weight value array based on the connection values when the data modifier 1402 operates in the compensation mode.

In a specific example, the data modifier 1402 may receive a predetermined weight value array including weight values (0.5, 0, 0, 0.8, 0.9, 0.4) and an array of connection values (1, 0, 0, 1, 1, 1). Since the second and the third connection values are zeroes, the data modifier 1402 may be configured to delete the corresponding weight values from the predetermined weight value array. That is, the second and the third weight values in the predetermined weight value array. The modified weight value array may be stored as an array including elements (0.5, 0.8, 0.9, 0.4).

In another example, the data modifier 1402 may receive a predetermined weight value array including elements (0.5, 0.8, 0.9, 0.4) and the same connection data including connection values (1, 0, 0, 1, 1, 1). Since the second and the third connection values are zeroes, the data modifier 1402 may be configured to add two elements of zero value to be the second and the third elements of the predetermined weight value array generating a modified weight value array including elements (0.5, 0, 0, 0.8, 0.9, 0.4).

At the block 1606, method 1600 may include the computing unit 1410 calculating the one or more groups of output data based on the modified weight values and the input data. In some aspects, the computing unit 1410 may include one or more multipliers configured to multiply the input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. An apparatus for modifying weight values for neural networks, comprising:
a data modifier circuit configured to:
receive a predetermined weight value array that includes one or more weight values for calculating one or more groups of output data based on one or more groups of input data,
wherein the one or more groups of the input data are stored as input elements in an input array and each input element of the input elements is identified by an input array index, and
wherein the one or more groups of the output data are to be stored as output elements in an output array and each output element of the output elements is identified by an output array index;
receive connection data that include one or more connection values,
wherein the one or more connection values are stored as a data set independent from the input data and the weight values,
wherein the one or more connection values represent connections between input nodes of the neural networks and the output nodes of the neural networks,
wherein each connection value of the one or more connection values corresponds to a pair of indexes,
wherein the pair of indexes include the input array index and the output array index, and
wherein each connection value of the one or more connection values is set to one when one of the one or more weight values in the predetermined weight value array satisfies a condition,
wherein each connection value of the one or more connection values is set to zero, when one of the one or more weight values in the predetermined weight value array does not satisfy the condition,
wherein the condition includes that an absolute value of one of the one or more weight values in the predetermined weight value array is less than a first threshold value and greater than a second threshold value, and wherein each weight value of the one or more weight values is designated for calculating a group of the output data to be stored as the output elements, wherein the output elements are identified by the corresponding output array index based on a group of the input data, the input data are stored as the input elements identified by the corresponding input array index; and delete the one or more weight values that does not satisfy the condition from the predetermined weight value array to generate a modified predetermined weight value array;

delete one or more groups of the input data from the input array, wherein the one or more groups of the input data corresponds to those connection values that are set to zero to generate modified input array; and a computing circuit configured to:

receive the modified predetermined weight value array from the data modifier circuit and the modified input array; and calculate the one or more groups of the output data based on the modified predetermined weight value array and the modified input array.

2. The apparatus of claim 1, wherein the data modifier circuit is further configured to add one or more zero values to the predetermined weight value array based on the connection values.

3. The apparatus of claim 1, wherein the computing circuit further comprises:

one or more multipliers configured to multiply the input data by the modified predetermined weight value array to generate one or more weighted input data.

4. The apparatus of claim 3, wherein the computing circuit further comprises:

one or more adders configured to add the one or more weighted input data to generate a total weighted value.

5. The apparatus of claim 4, wherein the one or more adders are further configured to add a bias value to the total weighted value to generate a biased value.

6. The apparatus of claim 5, wherein the computing circuit further comprises:

an activation processor configured to perform an activation function on the biased value to generate a group of the output data.

7. The apparatus of claim 1 further comprising a storage device configured to store the one or more groups of the input data, the input data, the connection data, the modified predetermined weight value array, instructions, and the calculated one or more groups of the output data.

8. The apparatus of claim 1 further comprising:

an instruction cache configured to store instructions received from a central processing unit;

a controller unit configured to read the instructions from the instruction cache and decode the instructions;

an input data cache configured to store the input data;

a weight cache configured to store the modified predetermined weight value array;

an output data cache configured to store the calculated one or more groups of the output data; and a direct memory access module configured to transmit and receive data from and to a storage device, the instruction cache, the controller unit, the input data cache, the weight cache, and the output data cache.

9. A method for modifying weight values for neural networks, comprising:

receiving, by a data modifier circuit, a predetermined weight value array that includes one or more weight values for calculating one or more groups of output data based on one or more groups of input data, wherein the one or more groups of the input data are stored as input elements in an input array and each input element of the input elements is identified by an input array index, and wherein the one or more groups of the output data are to be stored as output elements in an output array and each output element of the output elements is identified by an output array index;

receiving, by the data modifier circuit, connection data that include one or more connection values, wherein the one or more connection values are stored as a data set independent from the input data and the weight values, wherein the one or more connection values represent connections between input nodes of the neural networks and the output nodes of the neural networks, wherein each connection value of the one or more connection values corresponds to a pair of indexes, wherein the pair of indexes include the input array index and the output array index, and wherein each connection value of the one or more connection values is set to one when one of the one or more weight values in the predetermined weight value array satisfies a condition, wherein each of the connection values is set to zero, when one of the one or more weight values in the predetermined weight value array does not satisfy the condition, wherein the condition includes that an absolute value of one of the weight values in the predetermined weight value array is less than a first threshold value and greater than a second threshold value, and wherein each weight value of the one or more weight values is designated for calculating, by a data modifier circuit, a group of the output data to be stored as the output elements, wherein the output elements are identified by the corresponding output array index based on a group of the input data, the input data are stored as the input element identified by the corresponding input array index; and deleting, by the data modifier circuit, the one or more weight values that does not satisfy the condition from the predetermined weight value array to generate a modified predetermined weight value array;

deleting, by the data modifier circuit, the one or more groups of the input data from the input array, wherein the one or more groups of the input data corresponds to those connection values that are set to zero to generate a modified input array; and receiving, by the data modifier circuit, the modified predetermined weight value array and the modified input array; and calculating, by a computing circuit, the one or more groups of the output data based on the modified predetermined weight value array and the modified input array.

10. The method of claim 9, wherein the modifying further comprises adding, by the data modifier circuit, one or more zero values to the predetermined weight value array based on the one or more connection values.

11. The method of claim 9, wherein the calculating further comprises multiplying, by one or more multipliers of the computing circuit, modified input data of the modified input array by modified weight values of the modified predetermined weight value array to generate one or more weighted input data.

12. The method of claim 11, wherein the calculating further comprises adding, by one or more adders of the computing circuit, the one or more weighted input data to generate a total weighted value.

13. The method of claim 12, wherein the calculating further comprises adding, by the one or more adders of the computing circuit, a bias value to the total weighted value to generate a biased value.

14. The method of claim 13, wherein the calculating further comprises performing an activation function on the biased value to generate a group of the output data.

* * * * *